United States Patent
Hoo et al.

(10) Patent No.: US 6,829,307 B1
(45) Date of Patent: Dec. 7, 2004

(54) EXPRESS BIT SWAPPING IN A MULTICARRIER TRANSMISSION SYSTEM

(75) Inventors: Louise Min Chuin Hoo, Stanford, CA (US); Atul Arvind Salvekar, Stanford, CA (US); Carlos Aldana, Stanford, CA (US); John M. Cioffi, Los Altos Hills, CA (US); Peter Chow, Los Altos, CA (US); James Carlo, Dallas, TX (US)

(73) Assignees: The Board of Trustees of Leland Stanford Junior University, Palo Alto, CA (US); Texas Instruments, Inc., Dallas, TX (US)

( * ) Notice: Subject to any disclaimer, the term of this patent is extended or adjusted under 35 U.S.C. 154(b) by 0 days.

(21) Appl. No.: 09/513,716

(22) Filed: Feb. 24, 2000

Related U.S. Application Data

(60) Provisional application No. 60/123,096, filed on Mar. 5, 1999, provisional application No. 60/122,121, filed on Mar. 2, 1999, and provisional application No. 60/121,359, filed on Feb. 24, 1999.

(51) Int. Cl.[7] .................................................. H04K 1/10
(52) U.S. Cl. ........................ 375/260; 375/295; 375/222; 375/358
(58) Field of Search ................................ 375/260, 316, 375/222, 214, 358, 295

(56) References Cited

U.S. PATENT DOCUMENTS 5,400,322 A   3/1995   Hunt et al.

(List continued on next page.)

OTHER PUBLICATIONS

John M. Cioffi, "The Essential Merit of Bit–Swapping". ANSI Contribution T1E1.4/98–318R1, Dec. 1998.*

(List continued on next page.)

Primary Examiner—Temesghen Ghebretinsae
(74) Attorney, Agent, or Firm—Beyer Weaver & Thomas, LLP

(57) ABSTRACT

Methods and devices for adaptively changing a parameter (such as sub-carrier bit allocation and/or gain) in a multi-carrier communication signal are described. In a method aspect, a unit that determines a need for a change sends an express change request to a second unit. The change request identifies one or more specific sub-carrier carrier to be altered and a desired value for the parameter to be changed for each identified sub-carrier. The requesting unit then monitors the communication signal it receives to determine whether the requested change has been implemented. The determination of whether the requested change has been implemented is based at least in part upon an analysis of a portion of the received communication signal that was intended to be changed. In another aspect of the invention, the change request command includes a header, a control field, at least one sub-carrier identifier, at least one desired parameter value indicator, and an error field. The header identifies the command as a change request command. The control field includes a tone count that indicates the number of tones to be altered. Each sub-carrier identifier identifies a specific sub-carrier to be altered and each desired parameter value indicator identifies a desired parameter value for its associated sub-carrier. The error field permits the unit receiving the change request to detect whether there is an error in its interpretation of the change request command.

30 Claims, 6 Drawing Sheets

U.S. PATENT DOCUMENTS

| | | | | |
|---|---|---|---|---|
| 5,479,447 | A | | 12/1995 | Chow et al. |
| 5,491,727 | A | * | 2/1996 | Petit .......................... 375/358 |
| 5,671,251 | A | * | 9/1997 | Blackwell et al. .......... 375/222 |
| 5,671,253 | A | * | 9/1997 | Stewart ...................... 375/316 |
| 5,910,970 | A | | 6/1999 | Lu |
| 6,026,121 | A | * | 2/2000 | Sadjadpour ................. 375/262 |
| 6,357,029 | B1 | * | 3/2002 | Sinha et al. ................ 714/752 |
| 6,504,866 | B1 | * | 1/2003 | Beyda et al. ............... 375/222 |

OTHER PUBLICATIONS

"T1E1.4/98–007R5," Nov. 30–Dec. 4, 1998.

John M. Cioffi, "VDSL Alliance: VDSL Transmission Sepcificaton(00–116)," Feb. 21–27, 2000.

John M. Cioffi, "G.lite.bis: Analysis of Express Swapping Speeds and Reliability," Mar. 29–Apr. 2, 1999, Stanford University, Stanford, CA.

Salvekar, et al. "Channel Gain Change Detection and Channel Profile Selection in a Mulricharrier System," TAR Lab, Stanford, CA.

* cited by examiner

| TONE NUMBER | BIT ALLOCATION | GAIN |
|---|---|---|
| TONE #1 | 6 | -3.5 |
| TONE #2 | 11 | +1.5 |
| TONE #3 | 3 | -2.0 |
| TONE #4 | 5 | -1.0 |
| TONE #5 | 7 | +0.5 |
| TONE #N | N | N |

FIG. 2

6 - BIT CONSTELLATION

4 - BIT CONSTELLATION

# EXPRESS BIT SWAPPING IN A MULTICARRIER TRANSMISSION SYSTEM

CROSS-REFERENCE TO RELATED APPLICATIONS

This application claims the benefit to the following U.S. Provisional Applications: U.S. Provisional No. 60/121,359 filed on Feb. 24th 1999, U.S. Provisional No. 60/122,121 filed on Mar. 2nd 1999 and U.S. Provisional No. 60/123,096 filed on Mar. 5th 1999. The disclosures of each of the above-identified provisional patent applications are incorporated herein by reference.

BACKGROUND OF THE INVENTION

The present invention relates generally to high speed data transmission systems that use multi-carrier modulation. More particularly, an express parameter changing command and protocol suitable for use in multi-carrier transmission systems is disclosed.

In recent years, there has been increased interest in the use of multi-carrier modulation in high speed modems. By way of example, the Alliance For Telecommunications Information Solutions (ATIS), which is a group accredited by the ANSI (American National Standard Institute) Standard Group, has promulgated a discrete multi-tone based standard for the transmission of digital data over Digital Subscriber Lines (ADSL). The standard is intended primarily for transmitting data over ordinary telephone lines, although it may be used in a variety of other applications as well. The North American Standard is referred to as the ANSI T1.413 ADSL Standard and is incorporated herein by reference. Transmission rates under the ADSL standard are intended to facilitate the transmission of information at rates of up to at least 6 million bits per second (i.e., 6+ Mbit/s) over twisted-pair phone lines. The standardized system defines the use of a discrete multi tone (DMT) system that uses 256 "tones" or "sub-channels" that are each 4.3125 kHz wide in the forward (downstream) direction. In the context of a phone system, the downstream direction is defined as transmissions from a central office (typically owned by the telephone company) to a remote location that may be an end-user (i.e., a residence or business user).

Although the ADSL standard has been widely accepted, there are ongoing efforts to both improve the T1.413 ADSL standard and to provide ADSL or other standards for communications at other data rates. By way of example, there are currently ongoing efforts to define a simplified version of the standard which, among other things uses just 128 tones. This effort is being undertaken by T1.413 and is commonly referred to as the G.lite standardization effort. There is also an effort to define a standard for significantly higher data, which is referred to as the VDSL (Very High Rate Digital Subscriber Line) standard. The VDSL standard is intended to facilitate transmission rates of at least 25.96 Mbit/s and preferably at least 51.92 Mbit/s in the downstream direction. To achieve these rates, the transmission distance over twisted pair phone lines must generally be shorter than the lengths permitted using ADSL. Simultaneously, the Digital, Audio and Video Council (DAVIC) is working on a similar system, which is referred to as Fiber To The Curb (FTTC). The transmission medium from the "curb" to the customer premise is standard unshielded twisted pair (UTP) telephone lines.

One issue that is inherent in high speed DSL modems that use multi-carrier modulation is how to handle variations in line conditions. For example, in the T1.413 standard and other proposed DMT based systems, the communicating modems go through a brief training period before data communications begin. During the training period test signals are transmitted to effectively test the quality of the line at various frequencies. Generally the line quality is determined by measuring the signal-to-noise ratio (SNR) on each of the tones. The number of "bits" allocated to each tone are then determined based in large part on the detected training signals. However, after the training period, the transmission line often encounters changes that may affect its ability to transmit information at the allocated rates on some of the tones. The transmission line changes may result from a variety of causes including: a customer taking a phone off its hook or hanging up; temperature induced line changes; changes in cross talk noise due to adjacent lines becoming active or inactive, and the increase of AM radio signals at night.

If the line quality deteriorates over time, then more errors are likely to occur and something must be done to adjust the assigned bit allocation. One way to adjust the bit allocation is to simply retrain the modems. However, retraining has the drawback of taking a relatively large amount of time which causes a brief service interruption. The other way to adjust the bit allocation defined in the T1.413 standard is a procedure referred to as "bit swapping". The bit swapping protocol contemplates that when errors are detected on a particular tone, the amount of information transmitted on that particular tone will be reduced by some number of bits. If another tone is believed to have additional SNR, the amount of information transmitted is increased by a corresponding amount.

In the T1.413 standard, the bit swapping protocol is specifically defined. More specifically, when a particular receiver determines that a bit swap needs to be made, it send a bit swap request over an overhead channel (typically referred to as the AOC-ADSL Overhead Channel). The bit swap request has a designated format which is illustrated in FIG. 1. As seen therein, the first byte of the bit swap request is a message header 12. Message header 12 consists of all ones, which identifies the command as a bit-swap request. The message header 12 is followed by a message 14 of eight (or twelve) bytes. The message 14 is divided into 4 (or six) segments, each segment is called a message field 16. Each message field 16 contains a one byte command 18 followed by a one byte tone index 20 which identifies the tone to which the command is to be applied. The one byte command includes the functions: add a bit, delete a bit, increase power by 1, 2, 3 dB, decrease power by 1, 2, 3 dB, do nothing, and proprietary commands The T1.413 further requires that a 3-byte bit-swap acknowledge command be sent back to the unit requesting the bit swap to confirm receipt of the bit swap request. The bit-swap acknowledge command specifies a specific symbol count on which the swap will be implemented. The acknowledgement command is used to simplify detection of the implementation of a new bit distribution, but the acknowledgement, slows swapping speed and still may cause a failure if the acknowledgement is not received.

The T1.413 protocol further mandates that the bit-swap request command be transmitted five successive times and that the receiving unit only acknowledge the bit swap command if it receives a majority of those five transmissions. Thus, it takes 45 bytes to request to move one bit plus 15 bytes to acknowledge the request (which also must be repeated 5 times). Ignoring latencies, the minimum time for a swap is thus on the order of 30 ms (60 bytes at 16 kbytes/sec). However, current standards actually mandate that swapping occurs no more often than once every 800 ms, which allows for transceiver simplification, but further slows the swapping process in situations where more then four tones are to be changed. Thus, the standard ADSL bit-swapping mechanisms permit slow variations of the transmitter. However, with the advent of splitterless ADSL and the increasing popularity of DSL in general, it has become apparent that DSL lines will be subject to abrupt changes that require significant changes in the bit distribution. Given the slowness of the standardized bit swapping protocol and the drawbacks of requiring a retraining event, it has become apparent that a more efficient mechanism is needed to reduce the time it takes to implement bit redistribution in multi-carrier transmission systems.

SUMMARY OF THE INVENTION

To achieve the foregoing and other objects of the invention methods and devices for adaptively changing a parameter (such as sub-carrier gain or bit allocation) of a communication signal in a multi-carrier based transmission system are described. In one aspect of the invention, a unit that determines a need for a change sends a change request to a second unit. The change request identifies one or more specific sub-carriers to be altered and a desired value for a parameter associated with each identified sub-carrier. The requesting unit then monitors the communication signal it receives to determine whether the requested change has been implemented. The determination of whether the requested change has been implemented is based at least in part upon an analysis of a portion of the received communication signal that was intended to be changed.

In preferred embodiments, the change request is suitable for identifying a plurality of specific sub-carriers to be altered, as well as, a desired value for a parameter associated with each identified sub-carrier. By way of example, the parameter might be a desired bit allocation or a desired power level (gain) for the associated sub-carrier. The desired value may take the form of an absolute value (e.g. transmit 8 bits on this tone) or a relative value (e.g. increase the number of bits transmitted on this tone by 2). In another preferred embodiment, the protocol does not include any explicit acknowledgement that the change request was received or implemented.

The monitoring may be done in a wide variety of ways. By way of example, in some embodiments, the requesting unit redundantly decodes the received communication signal using both the current value of the parameter and the desired value of the parameter. In this embodiment, the determination of whether the requested change was implemented is based at least in part upon the decodings. By way of example, the determination of whether the requested change has been implemented may be based at least in part upon analyzing errors detected using each decoding and selecting the decoding that generates less errors. Another approach is to generate a first forward error correction syndrome based upon the current value decode and a second forward error correction syndrome based on the desired value decode. In this approach the determination of whether the change request was implemented is based on an analysis of the syndromes.

In some embodiments, the monitoring includes monitoring one or more of the specific sub-carrier(s) that are intended to be changed by the change request. If a change is detected on the specific sub-carriers, it is assumed that the change has been implemented. Again, this can be done using a wide variety of mechanisms. By way of example, when the multi-carrier signal is a DMT signal, the energy level of one or more of the tones can be monitored. For example, the change might increase the allowable power for a particular tone. In this scenario, if more energy is detected on that particular tone than would be expected using the current parameter values, then it can be assumed that the requested change had been implemented. Alternatively, one of the tones could be zeroed or a zeroed tone could be activated. These types of approaches are both relatively easy to implement and make it easy to detect the implementation of a change without requiring explicit feedback from the unit requesting the change.

In another aspect of the invention, the change request command includes a header, an express swap control, at least one sub-carrier identifier, at least one desired parameter value indicator, and an error field. The header identifies the command as a change request command. The express swap control specifies the changed tone count, which indicates the number of tones to be altered by the change request command. Each sub-carrier identifier identifies a specific sub-carrier to be altered by the change request command. Each desired parameter value indicator identifies a desired value of a parameter of its associated sub-carrier. The error field permits the unit receiving the change request to detect whether there is an error in its interpretation of the change request command. In some embodiments, a super frame number may be included in the header. In other embodiments, a super frame number may be included in the express swap control. Further, the super frame number specifies how many super frames later or on which super frame the express swap should occur.

In a preferred embodiment, the desired parameter value indicator identifies at least one of a desired bit allocation and a desired gain for its associated sub-carrier. In some embodiments, a single byte can be used to identify both the desired bit allocation and the desired gain for a particular sub-carrier.

In another aspect of the invention, an improved modem design that includes redundant decoders within the receiver is described. The redundant decoder are configured to decode a demodulated multi-carrier signal using different parameters for at least one of the subcarriers that is to be changed by a change request command. An analyzer is then provided to determine which of the redundant decoders has decoded the correct signal.

In one embodiment, the redundant decoders are subcarrier decoders arranged to decode the same subcarrier. In another embodiment, the redundant decoders are signal decoders arranged to decode a plurality of the subcarriers of the multi-carrier signal. In one specific implementation the analyzer includes redundant syndrome generators that are arranged to generate the syndromes of the signals decoded by the redundant decoders.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is an illustration of an exemplary bit and gain table.

DETAILED DESCRIPTION OF PREFERRED EMBODIMENTS

Figure 1:
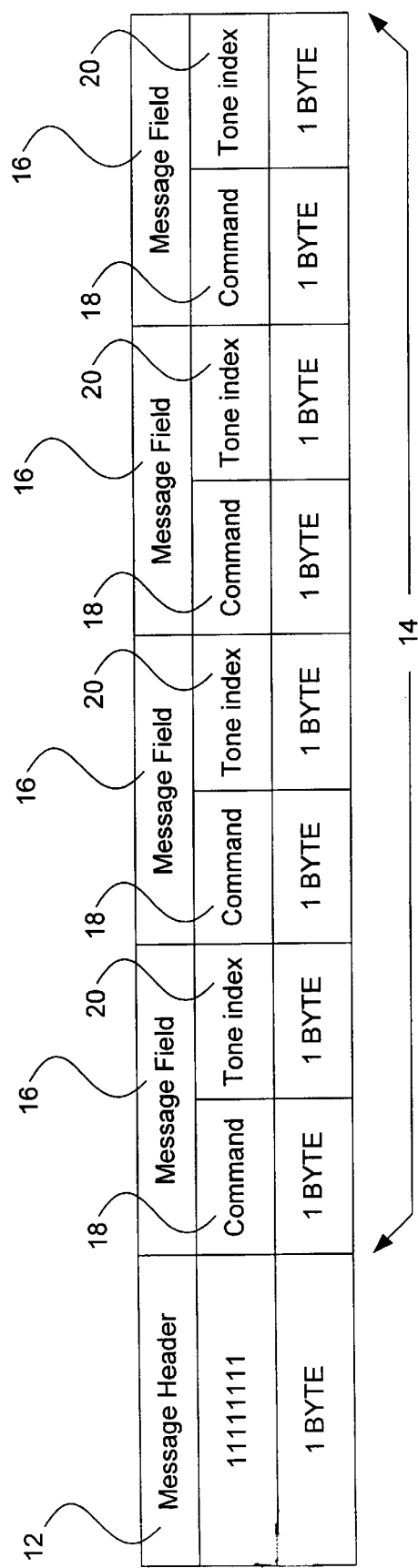
FIG. 1 an illustration of the T1.413 bit swap request format.

Methods, devices and protocols appropriate for implementing express bit swapping in multi-carrier transmission systems will now be described in detail with reference to a few preferred embodiments thereof and as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

In multi-carrier based communication systems, it is generally desirable to facilitate adaptive changes to the channel. In certain current implementations (such as the T1.413 ADSL standard), the concept of bit swapping is used to facilitate adaptive changes to the channel. However, the standard bit swapping arrangement is relatively slow and is therefore not particularly useful in addressing significant changes in the channel. Accordingly, the present invention seeks to provide improved mechanisms for implementing adaptive changes to the channel.

In general, in the context of the present invention, it is contemplated that when a transceiver determines that a change is appropriate, it sends an express change request to its counterpart. The requesting transceiver then monitors the signal it receives to determine whether the requested change has been implemented and decodes the received signal accordingly. For the purposes of illustration, the invention will be described in the context of a DSL based, point to point, bi-directional communication system that uses discrete multi-tone modulation. However, it should be apparent that the described techniques may readily be applied to any multi-carrier transmission system as well as point to multi-point systems.

In both conventional bit swapping (SB) and the described express swapping (ES), the receiver determines the need for a change based on the amount of errors that are being produced on the tones of the incoming signal. If it is determined that a change is needed, the receiver will determine the best possible allocation of bits for the problematic tones. For example, if the receiver measures an increase in noise (enough noise to cause errors) on one specific tone, the receiver may reallocate some of the bits from that tone to another tone that has less noise. The receiver stores the desired allocation of bits in a table (typically referred to as a bit and gain allocation table). For the most part, the bit and gain allocation table has an entry for every tone used in the multi-carrier signal and each tone entry includes a bit allocation and gain or power level associated with the corresponding tone. When a change is desired, the receiver sends a request to the transmitter asking for change in the signal that corresponds to the new allocation.

To facilitate discussion, FIG. 2 diagrammatically illustrates an exemplary bit and gain table 50. The bit and gain table 50 generally includes a tone number field 52, a bit allocation field 54, and a gain or power level field 56. The tone number field 52 contains entries for 128 tones for G.lite standard compliant operations and 256 tones for the G.dmt standard compliant operations. In other systems (such as some of the VDSL proposals) significantly more tones are being proposed and thus the number of entries may be widely varied. Further, each tone entry (one of the 128 or 256 tones) generally includes a bit allocation that defines the number of bits to be transmitted on the associated tone. The bit allocation for each tone is typically contained in the bit allocation field 54. The number of bits allocated to a particular tone will vary widely based on line conditions, desired transmission rate, the protocol being used, etc. By way of example, the number of bits allocated to each tone may vary in the range of 0 to 11 for G.lite transmission schemes and 0 to 15 for G.dmt transmission schemes. Again, these numbers may be widely varied in other systems. Further still, each tone entry generally includes a gain allocation that defines the transmit energy level on the associated tone. The gain allocation for each tone is typically contained in the gain allocation field 56.

Figure 3:
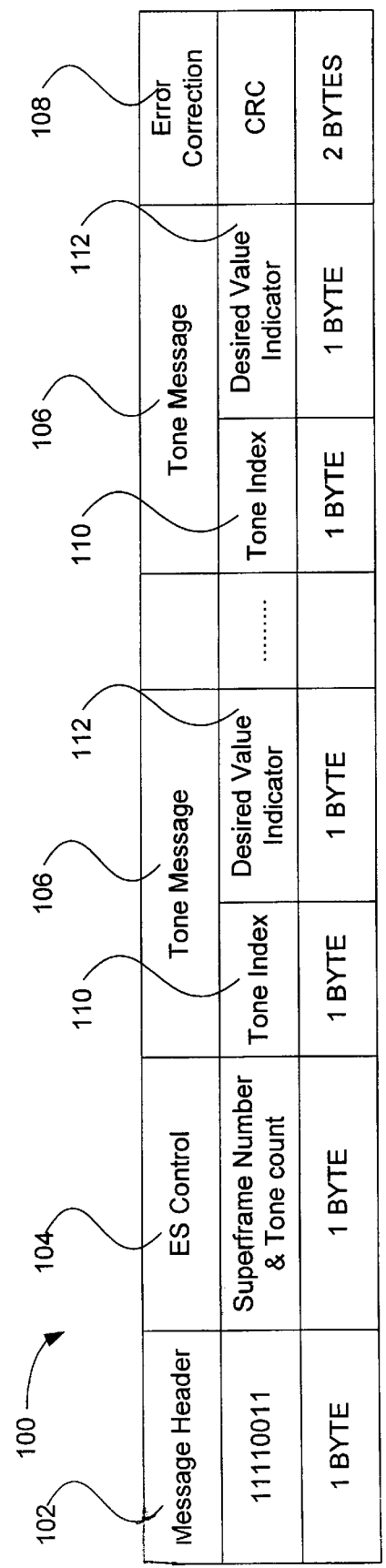
FIG. 3 is an illustration of an express swap request format, in accordance with one embodiment of the invention.

Referring next to FIG. 3, an express swapping command format, in accordance with one embodiment of the invention, will be described. As mentioned, when the receiver determines that a change is desired, it transmits an express swap command to the transmitter. The express swap command 100 includes a message header field 102, an express swap control field 104, a sequence of one or more tone messages 106 and an error field 108. The header field 102 includes a header value that identifies the command as a change request command. The express swap control 104 generally includes a super frame number that indicates how many super frames later or the super frame in which the express swap is to take place and a tone count that indicates the number of tones to be altered by the change request command. Each tone message 106 includes a tone index that identifies a specific sub-carrier to be altered by the change request command and a desired value indicator that indicates the desired bit allotment and gain parameters for the identified tone. The error field 108 permits the unit receiving the change request to detect whether there is an error in its interpretation of the change request command.

More specifically, the message header 102 identifies that the command is a change request command and can be any suitable size. By way of example, in the illustrated embodiment, it occupies one byte and contains a bit pattern (e.g. 11110011) that is predefined as the express swap command. In the G.dmt or G.lite implementations, swap commands are transmitted over an auxiliary overhead channel (AOC) and thus any message transmitted on the AOC that begins with the defined pattern is instantly recognized as an express swap command. Furthermore, although the header is shown in front of the command it should be noted that this is not a limitation and that the header may be placed anywhere in the command.

The message header 102 is followed by the express swap control 104, which indicates the super frame in which the express swap is to take place and the number of tones to be altered by the change request command. For example, if tones (#2, #80 and #95) were to be changed in a change request command, the tone count would be three. In the illustrated embodiment, the express swap control 104 also occupies one byte. By way of example, the express swap control 104 may have its most significant bit set to 0 if the transmitter should implement the express swap on the next super frame, and set to 1 if the transmitter should implement the express swap on the next-to-next super frame. Additionally, the remaining bits may enumerate the number of tones, n, that are changed by the next 2n bytes in the command. In the G.lite standard, 128 tones are utilized and thus one byte (remaining 7 bits) is sufficient to permit any number or even all of the tones to be changed in one command. In the G.dmt standard, however, 256 tones are utilized and therefore it may be desirable to increase the size of the express swap control (as for example to 8 bits). Furthermore, in other systems the use of significantly more than 256 tones is contemplated. By way of example, in some proposed VDSL systems, 4096 tones are contemplated. In such systems it may also be desirable to increase the size of the express swap control (as for example to 12 bits).

Although the super frame number has been described as being part of the express swap control, it should be noted that this is not a limitation and that the timing of the change can be indicated in a wide variety of ways. For example, the super frame number or super frame specification could be part of the message header or the timing could be part of a fixed agreement between the receiver and the transmitter. By way of example, the specification of the super frame number can be done using different message headers. Furthermore, it should be noted that a super frame number may not always be required. In cases such as these the super frame number can be removed from the command.

The express swap control 104 is followed by a sequence of tone messages 106 that each include a tone index 110 and a desired value indicator 112. Each tone index identifies a specific sub-carrier to be altered by the change request command. Each desired value indicator indicates the desired values for the tone parameters that are subject to change for the tone identified by the associated tone index. In the described embodiment, the tone bit allotment and the tone power (gain) are the two parameters that are subject to change. Thus, the desired value indicator 112 identifies the tone bit allotment and the gain for the tone identified by the associated tone index. The desired values may take the form of an absolute value (e.g. transmit 8 bits on this tone, set the gain to +1.5) or a relative value (e.g. increase the number of bits transmitted on this tone by 2, increment the gain by some level, etc.).

In the illustrated embodiment, the tone index 110 and the desired value indicator 112 each occupy one byte, although again, their sizes can be varied to meet the needs of a particular system. The size of the tone index is primarily dependent on the number of available tones. If more then 256 tones are available, then the tone count needs to be greater than one byte. However, one byte works well for both the G.dmt standard (which contemplates 256 tones) and the G.lite standard (which contemplates 128 tones). By way of example, in some proposed VDSL systems, 4096 tones are contemplated and therefore for such implementations it may be desirable to increase the size of the tone index to 12 bits.

The desired value indicator 112 indicates both the desired bit allotment and the desired gain for the tone identified by the associated tone index 110. The upper nibble (i.e. the first 4 bits) of the desired value indicator 112, indicates the new number of bits to be allocated to the associated tone. The maximum number of bits on any given tone is 11 for G.lite (15 for G.dmt). Thus, the upper nibble may be encoded as 0000 for no bits, 0010 for 2 bits, . . . , and up to 1111 for 15 bits. The lower nibble (i.e. the last 4 bits) of the desired value indicator 112, indicates a desired gain level. With 4 bits allocated, 16 different gain levels can be specified. Again, the desired gain value may take the form of either an absolute level or a relative change (e.g., increase power by 1, 2 or 3 dB, decrease power by 1 or 2 dB, or do nothing). By way of example in the discrete multi-tone example, 16 different gain levels between −4 and +3.5 dB (with 0.5 dB increments) relative to some nominal gain level may be designated with each potential value corresponding to a particular gain level. Although uniform gain levels are described, it should be understood that there are many different ways to map the available gain levels to the desired gain changes. Furthermore, the number of gain needs of a particular system.

Also, there is no need for the increments to be uniform. If more than 15 bits may be transmitted on any tone, or if more than 16 power levels are desired, then it may be preferable to provide more than one byte for the desired value indicator 112.

By way of example, increasing the size to two bytes would provide substantially more resolution. Of course, if different, additional or fewer parameters are controlled for a particular sub-carrier or tone, the desired value indicator can be adapted accordingly to convey the appropriate information.

In general, it is believed that using absolute values as the desired value is slightly more reliable than incrementally (relative) changing the bit and gain allocations because if the two modems ever get out of synch, the next swap command positively indicates the desired value. In contrast, when changing parameters incrementally, as in bit swapping, if the system gets out of synch, there is no mechanism for resynchronizing short of retraining the system.

It is possible that an express swapping command contains bit errors, and therefore an error field 108 is used to detect such errors. The error field contains a value (as for example, a check sum) that can be used to validate the transmitter's interpretation of the express swap command. When the transmitter detects an error in its interpretation of the express swap command, the transmitter does not implement the requested changes. Error detection is used in this manner so that the transmitter can only implement change requests that are validly transmitted without error. The size of the error field 108 may also be widely varied to facilitate implementation of a suitable error checking arrangement. By way of example, in the embodiment shown, the error field 108 occupies the last two bytes of the express swap command and stores a CRC (cyclic redundancy check) value.

The CRC is well known in the art and for the sake of brevity will not be described in detail herein. However, it should be mentioned that even with a 13 dB loss of margin (the reverse link may be affected by the same disturbance as the forward link and thus could also see temporarily a higher error probability) in the express swapping command transmission, the failure of the CRC has been estimated to occur only about once every 20 years. For this reason, barring an event that is so catastrophic that line maintenance is necessary, the express swapping command transmission is extremely reliable.

In alternate embodiments of the invention, the express swap command may be changed slightly to accommodate other formats such as VDSL. In one such embodiment, upon detecting changes in the sub-channel SNRs, the receiver initiates an express swap by sending an express swap request back to the transmitter via the VDSL Overhead Channel (VOC). Again, an express swap command is sent only once and allows alteration of the bit distribution (or gain distribution) on n tones through the transmission of the command. In one implementation, the VDSL express swap command includes a VOC message header field, an express swap control field, a sequence of one or more tone message fields, a dummy bit field and an error field. The VOC message header occupies one byte and consists of either the pattern 11110010 or 11110011 to indicate the ensuing express swap request. The header pattern 11110010 means the express swap should be executed in the next bit-swap frame while the pattern 11110011 means the express swap should be implemented in the next-to-next bit swap frame. The express swap control generally uses 12 bits and is arranged to indicate the total number of tones (n) whose bit/gain distributions need to be updated. Alternatively, the VDSL command may be arranged similarly to the previous mentioned express swap command by only having one header (11110011) and an ES control that includes 1 bit for specifying which bit-swap frame or after how many bit-swap frames to implement the express swap and 12 bits for specifying the tone count.

The tone messages generally use 20 bits and include a sub-channel index and a desired value indicator. The first 12 bits indicate the sub-channel index and the next 8 bits indicate the desired value indicator of which the upper nibble of 4 bits encode the new absolute number of bits (which is a number between 0 and a maximum of 15, according to 0000 for no bits, 0010 for 2 bits, up to 1111 for 15 bits) and the lower nibble of 4 bits, with the most significant bit as the sign bit, encodes the desired gain level relative to some known nominal value (by a 2's compliment 4-bit quantity between −4 and +3.5 dB (with 0.5 dB increments)). The dummy bit field is arranged to adjust the total amount of bits for the express swap command so that the command can be evenly described in bytes. Accordingly, if n (number of tones that need to be updated) is even then the dummy bit field will add 4 bits to the command, and if n is odd then the dummy field will not add any bits to the command. The error field generally uses 16-bit CRC protection for error detection. Furthermore, it should be noted that the dummy field is not a limitation and that the command can be arranged in other ways. By way of example, the command may be configured to have a variable length error field.

It should be apparent that although specific bit counts and specific bit patterns for certain commands have been described in the exemplary implementation, the actual number of bits allocated and the specific bit patterns used for specific commands or fields can be widely varied to meet the needs of any particular situation.

In bit swapping, an acknowledgement command is typically sent by the transmitter to the receiver to coordinate a time at which the swap will be implemented. That is, the transmitter informs the receiver that it will implement the change at a specific symbol. In contrast, in express swapping the receiver that initiates an express swap is responsible for monitoring the returned signal to determine if the command has been implemented by the transmitter. There is no bit swap acknowledgement command in the described express swapping. These acknowledgement commands increase the execution time for a swap and are preferably avoided in express swapping, thus requiring a receiver to know when an express swap has taken place.

Figure 4:
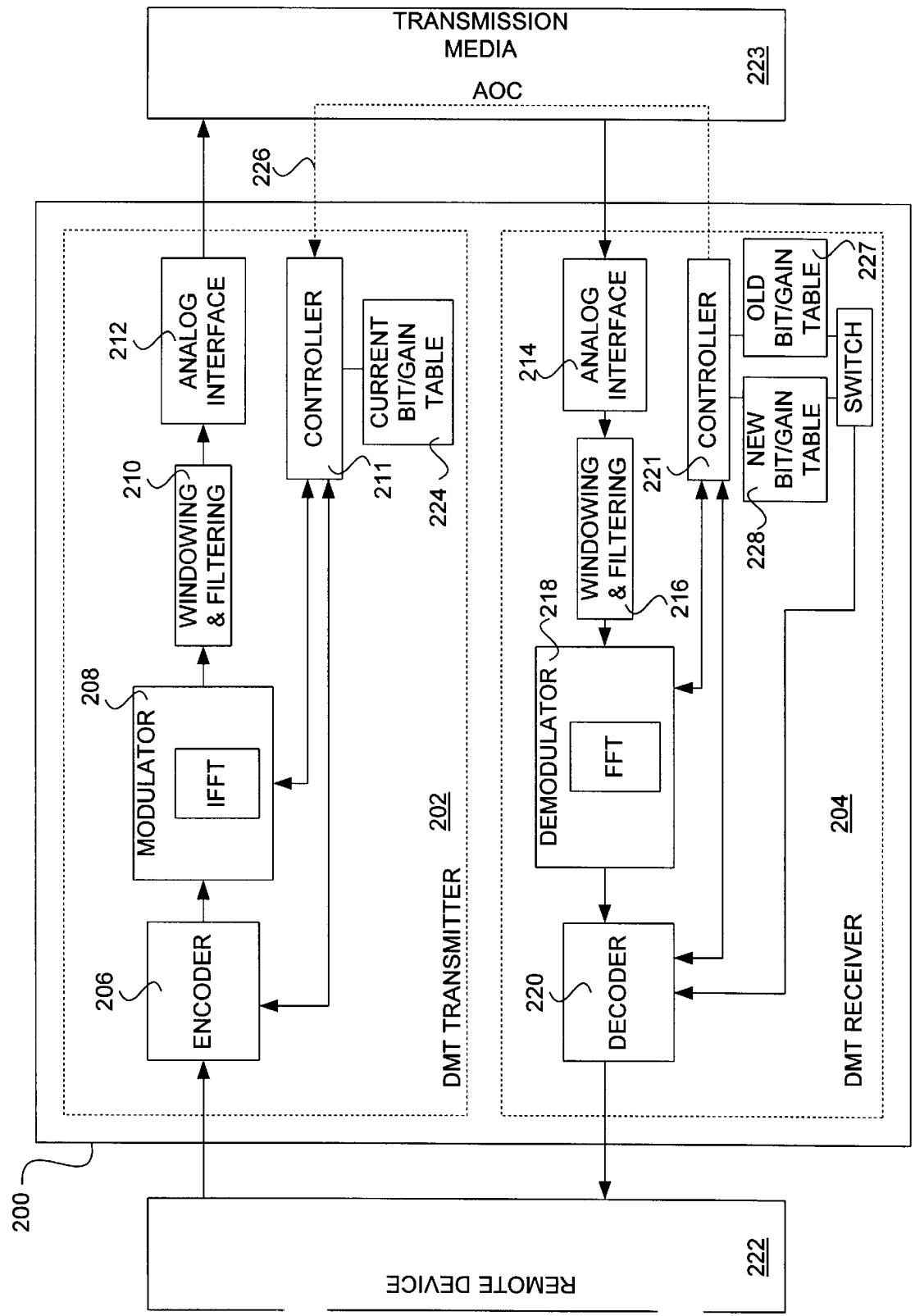
FIG. 4 is an illustration of a modem architecture, in accordance with one embodiment of the invention.

Referring next to FIG. 4, a modem architecture suitable for implementing the described express swap transmission scheme will be described, in accordance with one embodiment of the present invention. The modem 200 includes a transmitter 202, which incorporates several components including an encoder 206, a discrete multi-tone modulator 208, a windowing filter 210 and a controller 211. The encoder 206 serves to multiplex, synchronize and encode the data to be transferred (such as video data). More specifically, it translates incoming bit streams into in phase and quadrature components for each of the multiplicity of subchannels. The encoding may be done using a variety of error correction schemes. By way of example, forward error correction works well. The encoder 206 would typically be arranged to output a number of subsymbol sequences that are equal to the number of subchannels available to the system. By way of example, in a system having 256 subchannels, the encoder 206 would output 256 subsymbol sequences minus the number of subchannels in the restricted frequency band (s). These inputs are complex inputs that are passed to a discrete multi-tone modulator 208. The modulator 208 is generally an IFFT modulator that computes the inverse Fourier transform by any suitable algorithm.

After the encoded signal has been modulated to form a discrete multi-tone signal, the modulated signal is passed through a windowing filter 210 and/or other filters to minimize the out of band energy. This is desirable to help prevent the analog interfaces in the remote receivers from saturating. The windowing can be accomplished by a wide variety of conventional windowing protocols. The transmitter also includes an analog interface 212, which applies the discrete multi-tone signal to the transmission media 223. In hard-wired systems such as twisted pair phone lines and coaxial cables, the analog interface 212 may take the form of a line driver.

The modem 200 also includes a receiver 204 for receiving multi-tone signals from the transmitter(s). The receiver 204 generally includes an analog interface 214, a time domain equalizer (TEQ) 216, a demodulator 218, a decoder 220 and a controller 221. Signals received by the receiver 204 (from the transmitter) are initially received through the analog interface 214. The time domain equalizer 216 effectively performs filtering functions on the received signal. A windowing filter (not shown) may also be employed. The demodulator 218 demodulates the equalized discrete multi-tone signal and the decoder 220 decodes the demodulated signal. The demodulator 218 and the decoder 220 effectively perform inverse functions of the modulator 208 and encoder 206, respectively. By way of example, the demodulator 218 is generally an FFT modulator that computes the Fourier transform by any suitable algorithm. The decoded signal is then passed from the decoder 220 to a remote device 222 such as a video telephone, a television, a computer, or other suitable receiving apparatus.

In discrete multi-tone systems (DMT), the bit distribution of the DMT signal is adaptively determined to improve the transmission performance of the system. To facilitate this, the system generally includes a line monitor (not shown) that monitors the communication line to determine the line quality of each of the available subchannels. In one embodiment, the line monitor determines the noise level, gain and phase shift on each of the subchannels. The object is to estimate the signal-to-noise ratio for each of the subchannels. Therefore, other parameters could be monitored as well or in place of the parameters described. The determination of which subchannels to transmit the encoded data over as well as how much data to transmit over each subchannel is dynamically determined on the basis of several factors. The factors include the detected line quality parameters, subchannel gain parameter, a permissible power mask, and the desired maximum subcarrier bit error rates. It is noted that the factors need not be constant between subchannels and indeed may even vary during use. Most notably, the line quality parameters may be repeatedly checked, and adjustments in the modulation scheme are made in real time to dynamically adjust the modulation as the line quality over various subchannels changes during use. Channel monitoring will be described in greater detail below.

In most configurations, the receiver 204 is configured to monitor the channel performance and control the adaptation of DMT. By way of example, the controller 221 may include the line monitor as described above. In particular, the receiver 204 monitors the channel output signals to ascertain the necessity of a change in the transmitter bit and gain tables 224, which store the number of bits and corresponding transmit energy (or equivalents) to be used by each of DMT tones (or subchannels). Both the transmitter 202 and the receiver 204 store copies of the same tables and both use them for encoding and decoding, respectively. By way of example, the tables shown and described in FIG. 2 may be used. As can be appreciated, successful monitoring will determine changes in these tables that cause improvement in the transmission performance as the transmission line changes with time. Furthermore, an AOC (ADSL Overhead Channel) 226 typically exists from the receiver 204 back to the transmitter 202, as shown by the dashed line. As is well known, the AOC 226 is a dedicated portion of the total bandwidth of the system that is used between the receiver and the transmitter for communication there between. By way of example, the first 32 tones of a 256 tone system may be reserved for the AOC 226.

Upon determining the need for a change, a command (e.g., request for change) is sent through the AOC 226 to the transmitter 202. In most embodiments, the command is used to instruct the transmitter 202 to alter the configuration of the transmitter bit and gain table 224 (e.g., the number of bits and/or the transmit energy level on each of the tones used for the DMT transmission). By way of example, the command may be the express swap command shown and described in FIG. 3. After receiving the command, the transmitter 202 implements the requested changes. As mentioned, error detection may be used on the AOC 226 so that the transmitter 202 can implement only change requests that are validly transmitted without error.

In express swapping, the receiver 204 is configured to monitor the incoming DMT signal to determine whether the requested change was implemented by the transmitter. More specifically, the receiver 204 is configured to recognize the tones (sub-channels) associated with the signal that is currently being used (the "current signal"), and the tones associated with the desired signal (the "requested signal"). With this information the receiver can ascertain whether of not the request for change was implemented by comparing the tones of the incoming signal with the tones of the current signal or the tones of the desired signal (request for change signal). Using the current signal as an example, if the tones of the incoming signal are substantially similar to the tones of the current signal then the receiver may determine that the request for change has not been implemented. On the other hand, if the tones of the incoming signal are substantially different than the tones of the current signal then the receiver may determine that the request has been implemented. It should be born in mind that the present invention is not limited by using the current signal or the request for change signal separately, and that they may be used in combination. That is, the tones of the incoming signal can be compared with both the tones of the current signal and the tones of the request for change signal.

To elaborate further, the express swap receiver generally includes both an old bit/gain table 227 and a new bit/gain table 228. The old bit/gain table 227 is associated with the signal that was being used before the receiver 204 determined a change was necessary and the new bit/gain table 228 is associated with the signal that was requested after the receiver 204 determined a change was necessary. The decoder 220 uses both tables to determine if the incoming signal is old or new. That is, the incoming signal can be decoded according to the old channel gains (old table), the new channel gains (new table), or a combination of both the old and new channel gains (old and new table). Correspondingly, if the incoming signal is operating with the old bit/gain table 227 then there will tend to be a small amount of errors when the decoder 220 compares the signal to the old bit/gain table 227 and a large amount of errors when the decoder 220 compares the signal to the new bit/gain table 228. Conversely, if the incoming signal is operating with the new bit/gain table 228 then there will tend to be a small amount of errors when the decoder 220 compares the signal to the new bit/gain table 228 and large amount of errors when the decoder 220 compares the signal to the old bit/gain table 227. Accordingly, the receiver 204 can determine if the change was made based on these decodings.

Furthermore, even though the receiver can do the above comparison, it needs to do it relatively quickly. Therefore, the receiver is configured to analyze the incoming signals for a specific period of time, and if during this time the request for change is not detected the receiver knows that the transmitter did not implement the change. For example, if the receiver sees no change in the received channel output's bit tables after the last AOC byte is sent, then the receiver assumes the transmitter either could not or cannot implement express swapping for any reason. In one embodiment, if the request for change has not been detected within the combined downstream and upstream latency plus a time-out time, the receiver will assume the transmitter did not implement the command. The receiver may then elect to re-send the express swap command, perhaps use other corrective commands or execute a retrain if performance is unacceptable. In one particular embodiment, the time out time was chosen to be the next superframe boundary, which appears to work well. In this embodiment, a worst case time-out time of 17 ms is provided. However, it should be noted that the time-out time may be configured to be much faster. For example, the time-out time may be configured to be about 2 ms.

Although the modem architecture has been described in detail, it should be understood that the modem architecture may be embodied in many other specific forms without departing from the spirit or scope of the invention.

In accordance with one aspect of the present invention, the requesting receiver is configured to use a pair of decoders to decode the incoming signal using both the old bit/gain table (e.g., current signal) and the new bit/gain table (e.g., request for change signal). The determination of whether the requested change was implemented is based at least in part upon these two decodings. By way of example, the determination of whether the requested change has been implemented may be based at least in part upon analyzing errors detected using each decoding and selecting the decoding that generates the least amount of errors. Typically, the signal with the least amount of errors is the signal that is being transmitted. Therefore, the receiver can determine whether or not the request for change was implemented.

Figure 5:
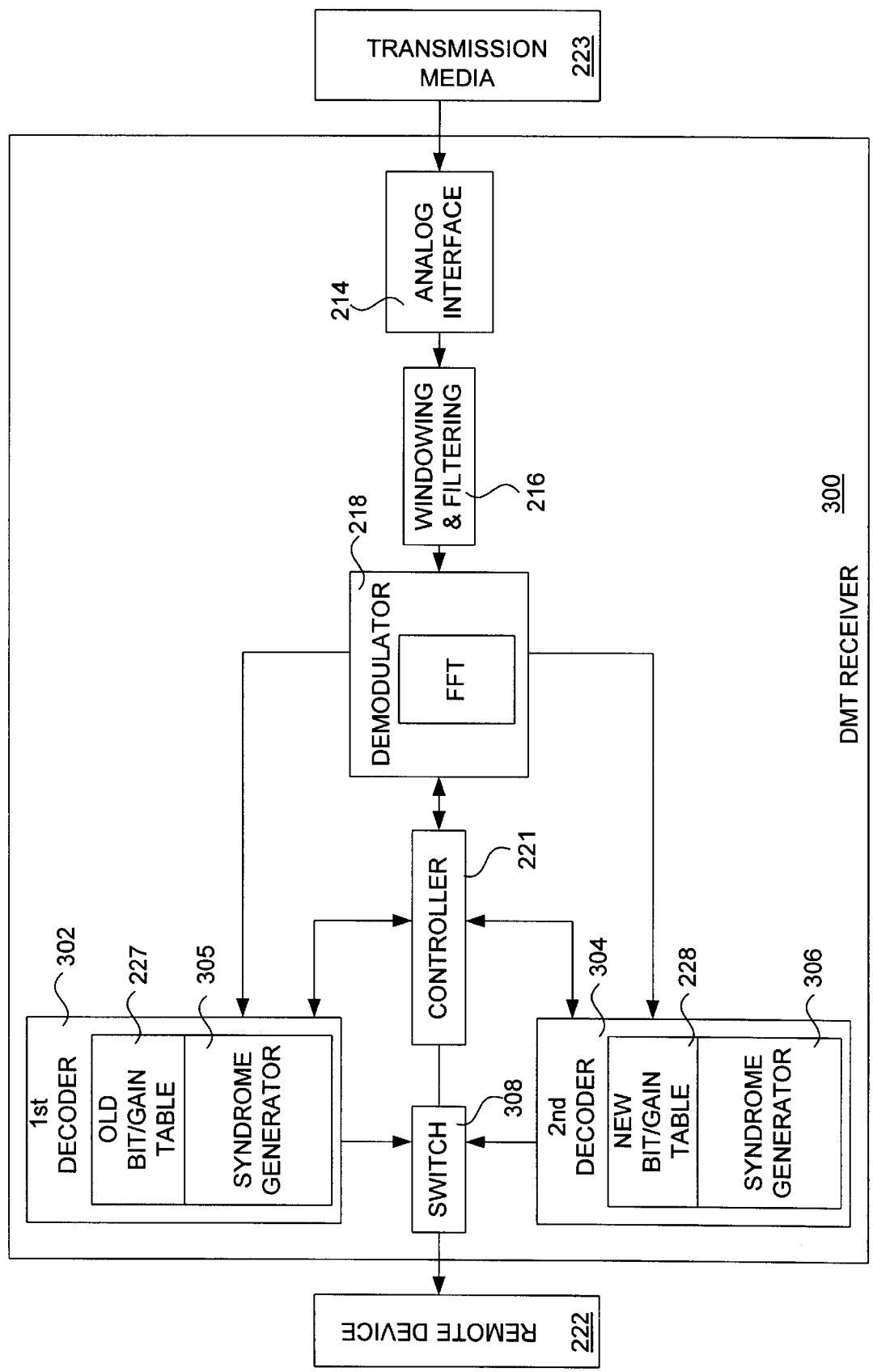
FIG. 5 is an illustration of a receiver, in accordance with one embodiment of the invention.

Referring to FIG. 5, a dual decoding receiver 300 will be described, in accordance with one embodiment of the present invention. Dual decoding receiver 300 includes a first decoder 302 and a second decoder 304, which is substantially similar to first decoder 302. In this embodiment, first decoder 302 is configured to store the bit/gain table 227 associated with a first set of tones (e.g., current signal) and second decoder 304 is configured to store the bit/gain table 228 associated with a second set of tones (e.g., new signal containing request for change).

Dual decoding receiver 300 also includes a first syndrome generator 305 that is associated with the first decoder 302 and a second syndrome generator 306 that is associated with the second decoder 304. By way of example, forward error correction (FEC) decoders that utilize FEC syndromes may be used. The first syndrome generator 305 is configured to compute a first syndrome using the current channel gains and noise for the received tones of the incoming signal. Similarly, the second syndrome generator 306 is configured to compute a second syndrome using the new or estimated channel gain and noise for the received tones of the incoming signal. The syndrome generator that detects the least amount of errors yields the correct match. It should be noted that the receiver 300 is generally configured to compute the syndromes when it knows a swap is going to occur (e.g., after a request for change). Additionally, the dual decoding receiver 300 includes a switch 308, which is generally used to release the signal having the correct syndrome. Controller 221 is typically used to control switch 308, which may be included within the controller 221, although this is not necessary (as shown).

To elaborate further, in a calculated syndrome a correct match is generally indicated by a zero and an incorrect match is generally indicated by a one. For example, if first syndrome generator 305 computed a zero and second syndrome generator 306 computed a one, then the incoming signal correctly matches the bit/gain table of the first set of tones and therefore receiver 300 recognizes that the request for change has yet to be implemented. As mentioned previously, if this occurs over a specified period of time then the receiver will time out and know that the request for change was never implemented. In this case, the receiver may elect to send another express swap command, some other command or retrain if the performance is unacceptable. On the other hand, if first syndrome generator 305 computed a one and second syndrome generator 306 computed a zero, then the incoming signal correctly matches the bit/gain table of the second set of tones and the receiver knows that the request for change has been implemented.

Further, if both syndromes are calculated to be non-zero then the line conditions are probably such that the originally requested express swap was not correct. Typically, this is a receiver-designer fault and the modem should retrain or raise an indicator (e.g., failure LED) because the line has become inoperable for the allowed bit distribution. That is, if the receiver system cannot repair the line with the express swap then it should either retrain or flag a line maintenance condition. Further still, if both syndromes are calculated to be zero then the error detection has probably failed for the situation that the channel bit/byte error pattern exactly corresponds to another (incorrect) codeword. The probability of such failure is significantly below the probability of failure of the CRC and can be assumed to be zero for practical purposes. Nonetheless, if this occurs, the receiver could also elect to delay the output further by checking the next codeword and then picking the previous table as well as current table. Typically, the failure rate is so low that further reduction is unnecessary. It should be noted that even this rare type of failure is not disruptive and is not a flaw in the modem, it simply means that errors (one codeword) occurred and the modem continues to operate successfully.

In accordance with another aspect of the present invention, the determination of whether or not a request for change has been implemented includes monitoring one or more tones that are intended to be changed by the change request. If a change is detected on these tones, it is assumed that the changes have been implemented. Such tones are more reliable than others because the express swap would not have otherwise requested the change. The energy level and the bit allocation of one or more of the tones may be monitored. For example, the change might increase the allowable power for a particular tone. In this scenario, if more energy is detected on that particular tone than would be expected using the current signal, then it can be assumed that the requested change has been implemented. In another example, the change might decrease the number of bits for a particular tone. If less bits are detected on that particular tone than would be expected using the current signal, then it can be assumed that the requested change has been implemented.

Figure 6B:
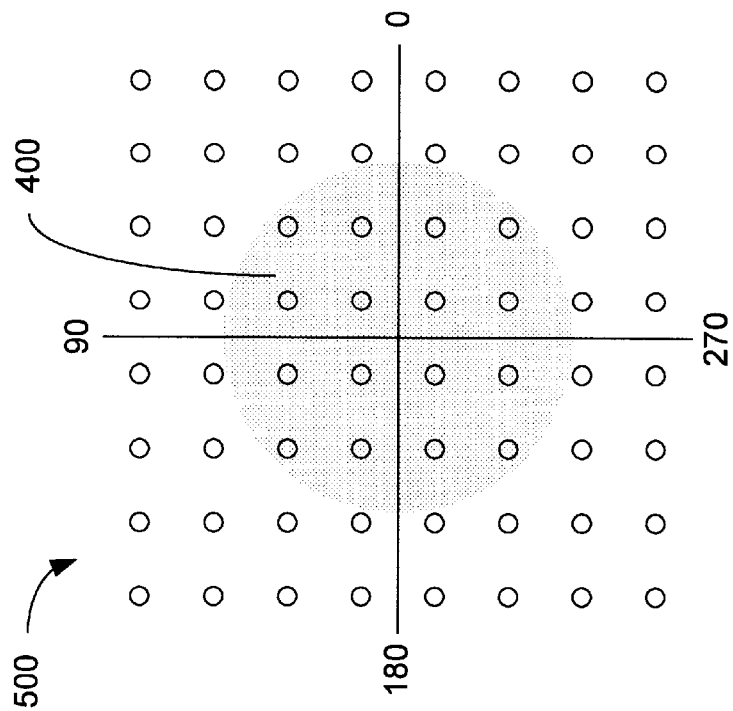
FIG. 6b is an illustration of an exemplary output constellation for a tone with a six bit allocation.
Figure 6A:
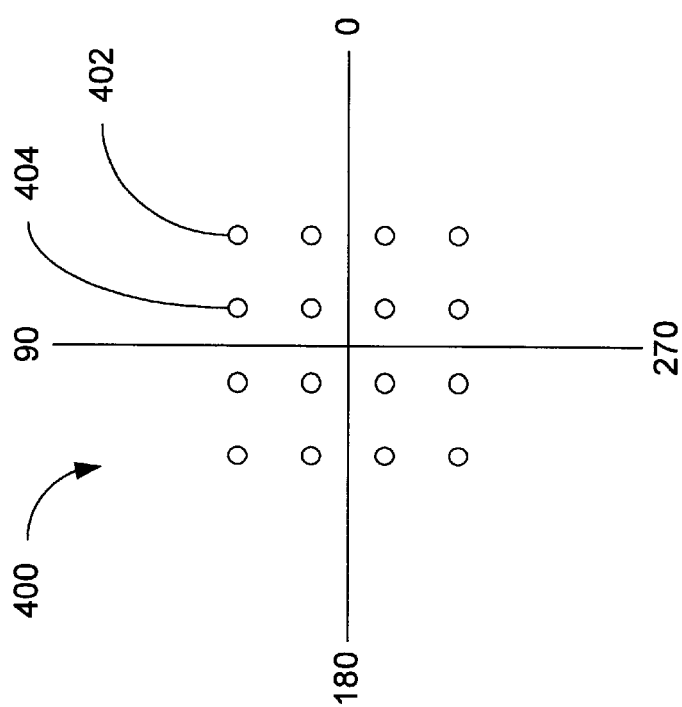
FIG. 6a is an illustration of an exemplary output constellation for a tone with a four bit allocations

In one embodiment, the requesting receiver is configured to monitor at least one tone of the modulated output (FFT output). Preferably, these tones are ones in which the express swap requested an increase in number of bits. These tones are generally more robust (e.g., less noise) because they can now handle more bits. However, it should be noted that this is not a limitation and that tones with decreasing amount of bits may also be used. The determination of whether or not a request for change has been implemented is based at least in part upon the changes in the output constellation of the incoming signal. Output constellations are graphical demonstrations of the bit distribution for a particular tone. The output constellation points generally include both the phase shift and amplitude of a particular tone. To facilitate discussion, FIG. 6a illustrates an exemplary FEQ (frequency equalizer) output constellation 400 for a tone with a 4 bit allocation. Output constellations are well known in the art and for the sake of brevity will be limited to the above description.

To elaborate further, a first output constellation of a particular tone in a first signal is compared to a second output constellation for the same to ne in a second signal to determine if a request for change has been implemented. If the second output constellation is larger than the first output constellation then the receiver will know that the request for change was implemented. By way of example, if a request for change increased the amount of bits on a specific tone by two, the points on the output constellation for that tone would increase by a factor of four. To facilitate discussion, FIG. 6b shows a 6 bit output constellation 500 (i.e., the 4 bit output constellation 400 with an increase of 2 bits). There are 16 points in the 4 bit output constellation 400 and 64 points in the 6 bit output constellation 500. Assuming, FIG. 6a represents the first signal and Fib. 6b represents the second signal, the receiver can determine that a request for change has been implemented based on the nature of the received signal. For example, the maximum gain (amplitude) of the first signal (from within the 16 point constellation) is less than the maximum gain (amplitude) of the second signal (which has a 64 point constellation).

In one specific implementation, a pair of redundant tone decoders, for a specific tone, may be utilized to compare output constellations. A decoder generally includes a plurality of individual tone decoders for each tone used in a multi-tone signal (e.g., 128 for G.lite and 256 for G.dmt.). Each individual tone decoder outputs a specific output constellation for that tone when decoding a transmitted signal. By doubling the amount of tone decoders for a specific tone a first transmitted signal having a first output constellation and a second transmitted signal having a second output constellation can be compared to determine if the request for change was implemented. However, it should be noted that while all of the specific tone decoders may be doubled, only a few may be necessary to determine a change with the appropriate reliability.

Importantly, a gain change of 1 dB or 2 dB can be identified incorrectly in the presence of noise. However, the occurrence of gain change on one tone in conjunction with gain change on other tones can be detected more reliably. Therefore, the receiver is not limited to monitoring one tone to determine if the request for changes was implemented. The receiver may monitor a plurality of tones on which there were bit increases and/or decreases, as well as, additional gain changes.

In another embodiment, the receiver may be configured to temporarily zero a good tone in the express swapping command to determine if the change request was implemented by the transmitter. The absence of transmitted energy on that tone indicates the implementation of the request for change by the transmitter. A second express swapping command that re-energizes the same tone later (and again detected by the presence of energy) can restore margin to full level. The loss of one tone is typically small in its effect on performance, but that generally depends on the channel.

As can be appreciated, accurate and fast channel identification is very important for the DMT system's effective use of express swap (or any swapping). Poor or incorrect channel monitoring is far more likely to lead to a DMT transmission failure than any reasonable line change, however abrupt. Accordingly, a few embodiments for successful channel monitoring will be described. It should be understood that the following methods are not a limitation and that there are a considerable number of creative mechanisms for monitoring line conditions. It should also be noted that these methods are generally most useful in addressing with gross channel changes rather than minor variations in bit/gain distributions. By way of example, gross channel changes may be changes that are so gross that slicer bit errors are highly likely on at least one tone of the DMT system. Express swapping can be useful in this type of situation to correct the channel quickly if the channel change can be identified.

By way of example, at least three measures strongly indicate a gross change: nonzero syndromes, superframe level CRC violations, and high values for instantaneous or short term mean-square error/noise estimates. The receiver can trivially measure any or all of the three and decide to enter a gross-change state. In the gross change state, the channel output power can be quickly measured. Since noise is typically at least 10 dB below signal on any tone of interest to the receiver, the instantaneous channel-output power estimate is sufficiently accurate to ascertain whether channel gain has changed. Channel gain change ca used by, for instance, off/on-hook impedance changes will affect many subchannels simultaneously and are easily distinguishable from newly energized crosstalk noise.

Channel changes generally correspond to changes in the measured channel transfer function. Typically, these changes are evident as both line attenuation changes and channel delay changes. Channel temperature variation can lead to channel change that is typically very slow and handled well by either SB or ES. Moisture variation caused by cables into which some water may enter during rain can be rapid (ad often cause line failure). When moisture is sufficiently small to leave the channel operable, the channel can change rapidly within a second or less. Off/on-hook impedance changes may be the most rapid type of channel-gain variation, and typically cause an attenuation loss/gain of 1–10 dB across most of the entire transmission band.

To detect gain change, the receiver monitors total received power. If the received power has changed significantly, then the gain path is pursued and the noise power is presumed to have not changed. Change in total channel output power is generally detected by monitoring the sum of squared channel output samples. A change in channel output power of 1 dB or more can be reliably estimated in 1000 samples or less (1 ms at G.lite sampling rates, even faster for other DSLs). A method to identify the frequency (tone) dependency of the channel change is to divide channel-FFT-output by the known synch-symbol FFT on the next occurrence of the synch symbol (which is at worst only 17 ms away). Since the noise has not changed, it is much smaller than the signal on any used tone. The newly estimated set of tone gains can be compared to stored channel profiles from the past. Receiver equalizers can be immediately updated for the newly computed gains, and the resultant new bit distribution is immediately conveyed to the transmitter with an ES command. The total estimation time may be as much as 20 ms before the new bit distribution is known.

In the frequency domain, on the $n^{th}$ tone, the output $Y_n$ is related to the input $X_n$ according to $$Y_n = H_n \cdot X_n + N_n$$

where $H_n$ and $N_n$ are the channel gain and noise power respectively. A set of previously identified channel gains (from previous initializations, retrains, or express swaps) can be stored for each profile of the channel that the DMT system has previously identified. These stored profiles are denoted $P_{l,n}$ for the l=1, ..., . Since the DMT system clock may have drifted from the last occurrence of the profile by some relative timing offset $\epsilon$ that causes a linear phase deviation from the old profile setting:

$$P_{l,n} \rightarrow P_{l,n} \cdot e^{j\frac{2\pi}{N}\epsilon n}.$$

Successful profile detection identifies which, if any, of the previous profiles best matches the latest measured $H_n$ for the known $X_n$ of the synchronization symbol.

Initially, profiles may not be known and so they must be generated. A simple estimate of $H_n$ is $$\hat{H}_n = \frac{\frac{1}{M} \cdot \sum_{k=1}^{M} Y_{n,k}}{X_n}$$

where M is the number of synchronization symbols used. Larger M yields more accurate channel estimates, but delays the implementation of the corrective express swap. The variance of the estimate generally decreases linearly with M so that, with 99% confidence, the measured SNR may be too high or too low (too high is of concern) by $$-10 \cdot \log_{10}\left(1 - \frac{3}{M}\right) \text{ dB}.$$

After 4 synchronization symbols, the computed SNR error is less than 2 dB with confidence 99%. Any receiver gain/phase-rotation (generally called an "FEQ") should be adjusted by the ratio $\hat{H}_{old,n}/\hat{H}_{new,n}$ immediately. Then the new channel can be stored as a profile if desirable.

However, if a profile has been previously been identified, then a single synchronization symbol can be used to reliably detect the reoccurrence of this profile according to maximum likelihood profile detection, which selects that profile which minimizes the sum (over the possible vector profiles $P_l$)

$$\min_{P_l} \sum_{n=1}^{N} \frac{|Y_n - P_{l,n} \cdot X_n|^2}{\sigma_n^2}.$$

The probability of false profile detection depends on the noise and the proximity of the profiles to each other, and in particular, is bounded by $$P_{false} \leq L \cdot Q\left(\min_{P_l \neq P} \sum_{n=1}^{N} \frac{|P_{l,n} - P'_{l,n}|^2 \cdot E_n}{\sigma_n^2}\right).$$

It is important to note that false detection may not correspond to link disfunction if the two profiles confused for each other are so close that the corresponding bit/gain tables are functional. The exact maintenance of profiles by the receiver expert system should choose the profiles so that the corresponding correcting bit distribution has very low probability of false detection if it would lead to DMT link failure.

Furthermore, if no significant channel gain (or output power) change is detected by the total power measure, then a significant noise change is presumed. Accurate estimation of noise variance, even with training signals, can take several seconds in DSL modems. However, it may be possible to load subchannels conservatively when, as usual, margin was high before the noise was introduced. Gaussian noise samples typically fall within ±3σ (3 standard deviations) distribution points with probability 0.997. A noise increase of 10 dB or more will begin to cause unacceptably high error rates in a DSL modem operating originally with 6 dB of margin at 1 e-7. With or without slicer errors at the FFT output in the receiver, the distribution of error samples for a much larger noise will have larger variance. A receiver can generally estimate the distribution (for Gaussian noise, this amounts to estimating the variance). While a very accurate estimate of the exact new noise variance takes a considerable number of samples (on the order of 3200 to get 1/10 dB accuracy, which is less than 1 second of training even with inefficient estimators), a more rapid gross indicator of large change is possible. Those tones with significant noise increase detected may be zeroed in the bit table through an ES. Subsequent noise estimation can continue, as these tones are de-energized in response to the ES request. When loading has more accurate results, more refined bit distributions can be transmitted with subsequent ES commands. Furthermore, noise profiles that approximate ISDN crosstalk, HDSL crosstalk, or other known types of crosstalk can be initially approximated and then refined by a sophisticated receiver, allowing very rapid adjustment through the ES command.

To elaborate further, when the noise change is large, an effective way to determine the noise is not to transmit any signal i.e., zero out the tones. The following describes several ways to estimate noise via tone zeroing.

In general, the instantaneous noise sample of each tone can be determined if there is no channel change (assumed) and the sych-symbol is known. This is best illustrated by $$\tilde{N}_n = Y_n - H_n \cdot X_n$$

The noise power is estimated by $$\hat{\sigma}_n^2 = \frac{1}{M} \sum_{l=1}^{M} |\tilde{N}_{m,l}|^2$$

The receiver then tells the transmitter via an ES command to zero those tones where $\hat{\sigma}_n^2$ exceed a specified threshold that is relative to the original noise power.

Usually, to speed up the noise estimation, the receiver must choose a small value of M for speed. This may produce an inaccurate estimate of the noise power and hence may lead to an inaccurate tone-zeroing profile. The accuracy of the tone-zeroing profile can be improved by postulating a relatively smooth power-spectral-density of the noise-variances. There are many clustering methods that can take advantage of such postulated smoothness.

In one embodiment, the conditions that define a contiguous set of tones in a cluster are generally the end tones which are zeroed tones or unused tones, and the tones preceding and following the cluster are used tones. In this embodiment, only those tones that are intended for use by the modem (i.e., non-POTS tones) will be considered. In general, zeroed tones are defined as a tone that carries 0 bits because the noise has increased by a sufficiently large amount, used tones are defined as tones that still carry nonzero bits after the new loading and unused tones are defined as tones that previously carried zero bits prior to loading due to either low channel gain or high noise variance.

The following example illustrates the cluster method. Let the symbols 0, X and U respectively denote a zeroed tone, a used tone and an unused tone. Then, given the following tone-zeroing profile for 20 tones,

| 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|----|----|----|----|----|----|----|----|----|----|----|
| X | 0 | X | 0 | 0 | 0 | X | 0 | 0 | X  | X  | U  | U  | U  | U  | 0  | 0  | X  | 0  | ,  | the possible clusters are (2,20), (2,18), (2,9), (2,6), (4,20) (4,18), (4,9), (4,6), (8,20), (8,18), (8,9), (12, 20) and (12, 18).

After the identification of the clusters, the next step is to determine which cluster should have its non-zeroed tones zeroed. This can be done according to the following heuristic: First, find the maximum size cluster that has at least a percentage of the tones zeroed then find the next largest cluster that has the same percentage of the tones zeroed until all of the clusters have been found. If the size of this cluster is the same as the number of used tones, retrain. Otherwise, zero the non-zeroed tones in the cluster and move the bits to other used tones if possible then go back to the first step ignoring the already zeroed cluster(s). In the example described above, if the percentage is equal to 75% then tones 3, 7 and 19 will be zeroed.

An alternative method for zeroing out tones without requiring an ES command to be sent, is to zero out a subset of tones using a predetermined sequence known by both the transmitter and the receiver. In this case, a command that signals the start of this tone zeroing method is needed. On the zeroed tones where the only signal that is measured is noise, a running average estimate the noise power can be obtained. For the zeroed tones, if the signal averages over 40 symbols, the signal can achieve 99% confidence to be within 2.0 dB or 99.9% confidence to be within 3 dB of the true noise variance.

Once a set of noise estimates have been obtained, they can be matched, in a maximum likelihood sense, to the stored noise profiles. Typical examples of crosstalk noise profiles are ISDN, HDSL and T1.

Using maximum likelihood estimation as the method to pick the most likely profile, one needs to find the profile of noise variances that best matches the noise samples acquired above. If the profiles are equally likely, one needs to find $$\max_{\Omega_j} p(\vec{N}^1, \vec{N}^2, \ldots \vec{N}^n \mid \Omega_j)$$

where $\vec{N}^k$ is a complex L dimensional vector containing the noise measurements on the $k^{th}$ tone and $\Omega_j$ is the jth cross talk profile containing variances. L denotes the number of noise measurements made on the $k^{th}$ tone. This expression simplifies to $$\min_{\Omega_j} C_j + \sum_{i=1}^{N} \frac{D_i}{\sigma_{j,i}^2}$$

where L is the number of symbols used for estimating the noise variance, $\sigma_{j,i}^2$ is the variance of the ith tone in the jth profile, $$D_i = \frac{1}{L}\sum_{k=1}^{L} |N_{k,i}|^2 \text{ and } C_j = \sum_{i=1}^{N} \ln(\sigma_{j,i}^2),$$

$N_{k,i}$ is the measured noise at time k for the ith tone and $D_i$ is the empirical noise variance on the ith tone. The above expression allows one to identify the noise profile that is closest to the measured noise.

The following three examples, compare implementation speeds for express swapping and bit-swapping:

EXAMPLE 1

A Single bit is Swapped

Moving one bit in conventional bit-swapping takes 60 bytes of AOC bandwidth, which theoretically could traverse the bi-directional AOC channel in about 30 ms (60 bytes/ (2000 bytes/sec)). However, the G.lite and G.dmt standards (for reasons of implementation latency) do not allow more than one bit-swap exchange in 800 ms. This 800 ms does not apply to express swapping. The 800 ms cannot easily be removed from older bit swapping because of backward interoperability reasons (but there is no such issue on modems that would use express swapping). In contrast, express swapping requires an 8-byte command that only uses a unidirectional AOC channel and thus takes about 21 ms (8 bytes/(2000 bytes/sec)+17 ms (timeout worst case).

| Express swapping | Bit swapping theory | Bit swapping actual | Express swapping improvement theory | Express swapping improvement actual |
|---|---|---|---|---|
| 21 ms | 30 ms | 800 ms | 1.5 X | 40 X |

EXAMPLE 2

40 Bits are Moved on 10 Tones

This type of swap might be typical of a moderate noise change on the line, such as an AM radio receiver increasing its power level at night. Conventional bit swapping theoretically requires a minimum of 60 bytes×(40 bits)=2400 bytes, taking 1.2 seconds. The actual time (based on 800 ms minimum per one bit swap) is 40 (0.8 s)=32 seconds. In contrast, express swapping requires 2 bytes×(10 tones)+4 bytes=24 bytes, taking 29 ms (including a 17 ms worst case time-out). Thus, the speed up is even greater for a greater number of bits.

| Express swapping | Bit swapping theory | Bit swapping actual | Express swapping improvement theory | Express swapping improvement actual |
|---|---|---|---|---|
| 29 ms | 1.2 seconds | 32 seconds | 42 X | 1142 X |

EXAMPLE 3

A Profile Change of 400 Bits on 100 Tones

This type of swap might be typical of a severe channel change on the line, such as an off-hook impedance change. The bit swapping protocol takes a theoretical 12 seconds and an actual 320 seconds. Clearly in this case, a retrain is faster and probably should be used because errors are likely to be made while bit swapping is fixing the problem. Express swapping moves all 400 bits with a 204 byte AOC command, requiring 119 ms. The speed up is enormous over bit swapping, and much faster than retraining, without disruption of the service (although some bit errors may occur over the express swapping interval given that the channel has undergone severe changes in its characteristic).

| Express swapping | Bit swapping theory | Bit swapping actual | Express swapping improvement theory | Express swapping improvement actual |
|---|---|---|---|---|
| 119 ms | 12 seconds | 320 seconds | 100 X | 2500 X |

Figure 7:
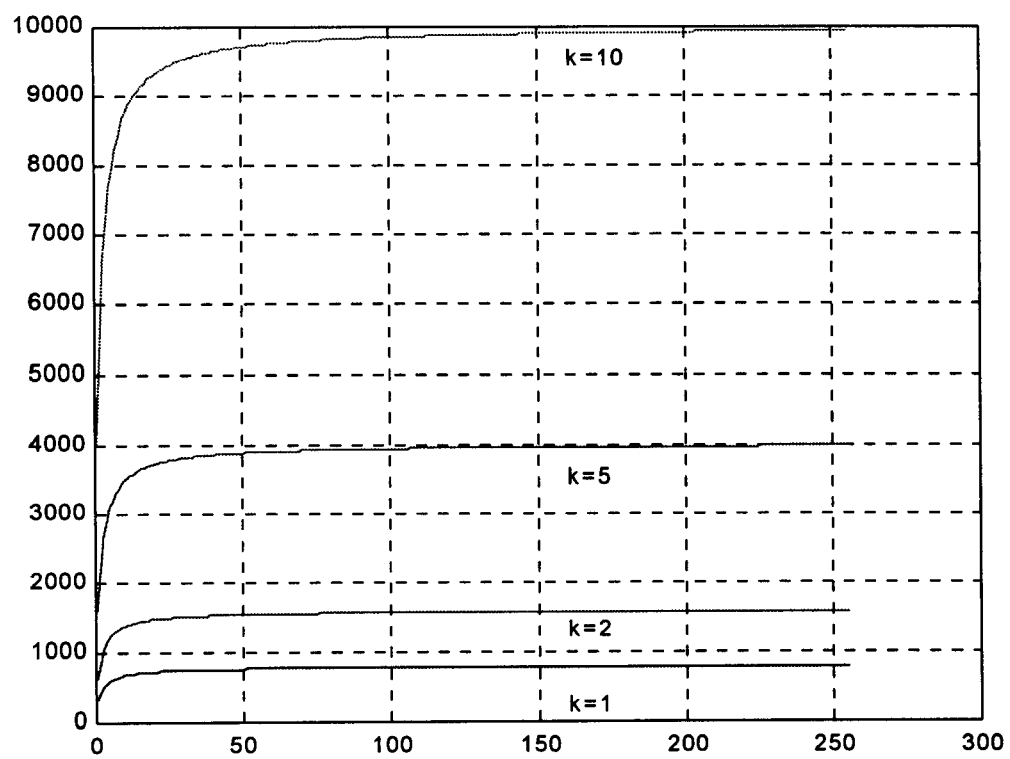
FIG. 7 is a plot of the improvement factor of express swapping vs. the number of affected tones.

To elaborate further, the ES requires $(2n+4)/R_{AOC}+T_{time-out}$ seconds to implement with n the number of affected tones, $R_{AOC}$=the AOC channel rate in BYTES/s, and $T_{time-out}$=the time-out time, which is a worst-case of 17 ms and may be considerably faster. The time-out time is the time by which if the receiver sees no change in the received-channel-output's bit tables after the last AOC byte is sent, the receiver then assumes the transmitter either could not or cannot implement ES for any reason. For simplicity reasons, the time-out was chosen to be the next superframe boundary (but could be less in theory). Conventional swapping requires simply 0.8 b seconds, where b is the number of moved bits. FIG. 7 is a graph that plots the improvement factor versus number of affected tones for b=kn where k=1,2,5, and 10. (This particular plot actually uses a time-out of 2 ms, which may also be of interest.). As shown, the factor of improvement of the ES protocol is very large in all cases. Thus, the protocol itself is probably sufficient for faster swapping.

As can be seen from the foregoing, the present invention offers numerous advantages over the prior art. By way of example, express swapping increases the speed of bit-swapping. In some situations, express swapping may be 10,000 times faster than bit swapping. Furthermore, the execution time of express swapping is almost instantaneous and is found to be sufficient to maintain connectivity through a number of dramatic change events, in particular the sudden introduction of a large cross talker. Additionally, the use of the express swapping command requires no additional information be passed during initialization. That is, there is no acknowledgement packet and the request for change command only has to be sent once. Still further, express swapping improves the reliability of the connection in situations demanding a faster change, thereby reducing the necessity and frequency of retraining.

Details associated with bit swapping are also explained and described in the following references: Salvekar et al., "CHANNEL GAIN CHANGE DETECTION AND CHANNEL PROFILE SELECTION IN A MULTCARRIER SYSTEM," Globecom, December 1999, John M. Cioffi, "VDSL ALLIANCE: VDSL TRANSMISSION SPECIFICATION (00-116)",T1E1.4:VDSL, February 2000, Cioffi et al., "G.LITE.BIS: ANALYSIS OF EXPRESS SWAPPING SPEEDS AND RELIABILITY," April 1999, which are incorporated herein by reference.

An alternate approach to increasing the speed of the swap will now be described. The new approach includes a receiver and a transmitter that both monitor the channel and store profiles of different channel changes. During processing, if a change is detected, the receiver and the transmitter switch to the same stored profile (maybe one of 16 profiles) and continue to operate. Accordingly, no express swap command or any other command is sent from the receiver and therefore the swap is much faster. More specifically, the receiver and the transmitter are configured to include a line monitor for monitoring the channel performance and controlling the adaptation of the signal. By way of example, the receiver and transmitter may include the line monitor as described above. The receiver and the transmitter are also arranged to store a plurality of predetermined profiles that correspond to certain line changes. Correspondingly, when the line monitors detect a change in the channel, they direct the associated device to choose a predetermined profile that best fits the desire change. In this manner, both the receiver and transmitter may operate with a predetermined profile. By way of example, the predetermined profile may include the bit and gain distribution for each of the tones of the multi-tone signal.

Although only a few embodiments of the present inventions have been described in detail, it should be understood that the present inventions may be embodied in many other specific forms without departing from the spirit or scope of the inventions. Particularly, the invention has been described in terms of express swapping for discrete multi-tone systems. However, it should be appreciated that the described invention could be used in a wide variety of other systems as well. By way of example, multi-channel or multi carrier systems that require dynamic adaptation of its sub-channel (sub-carrier bits and gains). Further, it is contemplated that receiver monitoring may be done in a wide variety of ways and may be widely modified without departing from the scope of this invention. Therefore, the present examples are to be considered as illustrative and not restrictive, and the invention is not to be limited to the details given herein, but may be modified within the scope of the appended claims.

What is claimed is:

1. A method of adaptively changing a parameter of a communication signal in a transmission system, the transmission system using multi-carrier modulation, the method comprising:

transmitting a change request from a receiver to a transmitter, the change request being arranged to identify a specific sub-carrier to be altered and a desired value for a parameter associated with the identified sub-carrier, the desired value for a parameter being different than a current value of the parameter; and monitoring the received communication signal to determine whether the requested change has been implemented, wherein the determination of whether the requested change has been implemented is based at least in part upon an analysis of a portion of the received communication signal that was intended to be changed, the monitoring including decoding the received communication signal using the current value of the parameter and the desired value of the parameter and determining whether the requested change was implemented based at least in part upon the decoding.

2. The method as recited in claim 1 wherein the change request is arranged to identify a plurality of specific sub-carriers to be altered, and for each identified sub-carrier, a desired value for a parameter associated with such sub-carrier.

3. The method as recited in claim 1 wherein the communication signal does not include any explicit acknowledgement that the change request was received or implemented.

4. The method as recited in claim 1 further comprising generating a first forward error correction syndrome based upon the current value decode and a second forward error correction syndrome based on the desired value decode, wherein the determination of whether the change request was implemented is based on an analysis of the syndromes.

5. The method as recited in claim 1 wherein the monitoring includes monitoring the specific sub-carrier that is intended to be changed by the change request to determine whether the requested change has been implemented.

6. A method of adaptively changing a parameter of a communication signal in a transmission system, the transmission system using multi-carrier modulation, the method comprising:

transmitting a change request from a receiver to a transmitter, the change request being arranged to identify a specific sub-carrier to be altered and a desired value for a parameter associated with the identified sub-carrier, the desired value for a parameter being different than a current value of the parameter; and monitoring the received communication signal to determine whether the requested change has been implemented, wherein the determination of whether the requested change has been implemented is based at least in part upon an analysis of a portion of the received communication signal that was intended to be changed, and upon analyzing errors detected based on decoding the communication signal using both the current value and the desired value of the parameter.

7. A method of adaptively changing a parameter of a communication signal in a transmission system, the transmission system using multi-carrier modulation, the method comprising:

transmitting a change request from a receiver to a transmitter, the change request being arranged to identify a specific sub-carrier to be altered and a desired value for a parameter associated with the identified sub-carrier, the desired value for a parameter being different than a current value of the parameter; and monitoring the received communication signal to determine whether the requested change has been implemented, wherein the determination of whether the requested change has been implemented is based at least in part upon an analysis of a portion of the received communication signal that was intended to be changed, the monitoring including analyzing a first constellation for the sub-carrier at a first time with a second constellation for the sub-carrier at a second time;

whereby the request for change is known to be implemented if the second constellation is different from the first constellation.

8. A method of adaptively changing a parameter of a communication signal in a transmission system, the transmission system using multi-carrier modulation, the method comprising:

transmitting a change request from a receiver to a transmitter, the change request being arranged to identify a specific sub-carrier to be altered and a desired value for a parameter associated with the identified sub-carrier, the desired value for a parameter being different than a current value of the parameter; and monitoring the received communication signal to determine whether the requested change has been implemented, wherein the determination of whether the requested change has been implemented is based at least in part upon an analysis of a portion of the received communication signal that was intended to be changed, the monitoring including monitoring one sub-carrier of the communication signal such that the one sub-carrier has been altered to equal zero based upon the implementation of the change request;

whereby the absence of transmitted energy on that sub-carrier indicates the implementation of the requested change by the transmitter.

9. In a multi-carrier communication system that facilitates bi-directional communications between a pair of modems using an adaptive multi-carrier transmission signal embodied as a carrier wave, a change request command embodied as a carrier wave and arranged to communicate desired changes in parameter values associated with specific sub-carriers within the multi-carrier transmission signal between the pair of modems, the change request command comprising:

a header arranged to identify the command as a change request command;

a control field arranged to indicate the number of tones to be altered by the change request command;

at least one sub-carrier identifier, each sub-carrier identifier being arranged to identify a specific sub-carrier to be altered by the change request command;

at least one desired parameter value indicator, each indicator being arranged to identify a desired value of a parameter associated with a sub-carrier identified by an associated sub-carrier identifier; and an error field.

10. The command as recited in claim 9 wherein the desired parameter value indicator identifies a number of bits of information to be transmitted by the sub-carrier identified by the associated sub-carrier identifier.

11. The command as recited in claim 9 wherein the desired value of the indicator is the total number of bits to be altered for a specific sub-carrier.

12. The command as recited in claim 9 wherein the desired parameter value indicator identifies a gain to be used by the sub-carrier identified by the associated sub-carrier identifier.

13. The command as recited in claim 12 wherein the desired value of the indicator is in increments of about 0.5 dB between about −4.0 dB to about +3.5 dB.

14. The command as recited in claim 9 wherein the error field includes a cyclic redundancy check code.

15. The command as recited in claim 9 wherein the header includes a super frame number that indicates when the change request is to take place.

16. The command as recited in claim 9 wherein the control field includes a super frame number that indicates when the change request is to take place.

17. A method of adaptively changing a parameter of a communication signal in a transmission system, the transmission system using multi-carrier modulation, the method comprising:

receiving a change request from a receiver at a transmitter, the change request being arranged to identify a specific sub-carrier to be altered and a desired value for a parameter associated with the identified sub-carrier, the desired value being different than a current value of the parameter;

implementing the request for change such that the identified sub-carrier is modified to retain the desired value for the parameter associated with the identified sub-carrier; and transmitting a multi-carrier signal that includes the implemented request for change, the multi-carrier signal not including an explicit acknowledgement command, wherein the request for change includes a sub-carrier count arranged to indicate the number of sub-carriers to be altered by the change request.

18. The method as recited in claim 17 wherein the request for change includes a header arranged to identify the request for change.

19. The method as recited in claim 17 wherein the request for change includes at least one sub-carrier identifier, each sub-carrier identifier being arranged to identify a specific sub-carrier to be altered by the change request.

20. The method as recited in claim 17 wherein the request for change includes at least one indicator, each indicator being arranged to identify a desired value of a parameter associated with a sub-carrier identified by an associated sub-carrier identifier.

21. The method as recited in claim 17 wherein the request for change includes an error field.

22. The method as recited in claim 17 wherein the request for change includes a super frame number that indicates when the change request is to take place.

23. In a discrete multi-tone transmission system, a method of express bit-swapping, the method comprising:

transmitting a change request from a receiver, the change request being arranged to identify a specific tone to be altered and a desired value for a parameter associated with the identified tone, the desired value being different than a current value of the parameter;

receiving the change request at a transmitter, the change request being arranged to identify a specific tone to be altered and a desired value for a parameter associated with the identified tone, the desired value being different than a current value of the parameter;

implementing the request for change at the transmitter such that the identified tone is modified to retain the desired value for the parameter associated with the identified tone;

transmitting a multi-tone signal from the transmitter, the multi-tone signal including the implemented request for change;

receiving the multi-tone signal at the receiver; and interpreting the received multi-tone signal to determine whether the requested change has been implemented, the interpreting being based on at least the desired value of the parameter, wherein the change request is configured to affect a substantial number of tones.

24. The method as recited in claim 23 wherein the multi-tone signal does not include an explicit acknowledgement command.

25. A discrete multi-tone modem, the discrete multi-tone modem being in communication with a transmitter, comprising:

a receiver configured for transmitting a change request to the transmitter, the change request being arranged to identify a specific tone to be altered and a desired value for a parameter associated with the identified tone, the receiver configured for receiving a multi-tone signal from the transmitter, the receiver being arranged to determine whether or not the request for change was implemented by the transmitter, wherein the determination of whether the request for change was implemented is based at least in part upon an analysis of a portion of the multi-tone signal that was intended to be changed, the receiver being arranged to analyze a plurality of received first tones and a plurality of received second tones, the first tones including parameters associated with the first tones, the second tones including altered parameters based on the request for change, the request for change being implemented at the transmitter, the receiver being arranged to determine whether the first tones are different from the second tones by comparing the parameters of the first tones with the altered parameters of the second tones;

whereby if the parameters of the first and second tones are substantially similar the implementation did not occur and if the parameters of the first and second tones are not substantially similar the implementation did occur.

26. The modem as recited in claim 25 wherein the determination of whether the request for change was implemented does not include an explicit acknowledgement from the transmitter that the request for change was implemented.

27. The modem as recited in claim 25 wherein the desired value of the parameter is different than a current value of the parameter.

28. A discrete multi-tone modem, the discrete multi-tone modem being in communication with a transmitter, comprising:

a receiver configured for transmitting a change request to the transmitter, the change request being arranged to identify a specific tone to be altered and a desired value for a parameter associated with the identified tone, the receiver configured for receiving a multi-tone signal from the transmitter, the receiver being arranged to determine whether or not the request for chance was implemented by the transmitter, wherein the determination of whether the request for change was implemented is based at least in part upon an analysis of a portion of the multi-tone signal that was intended to be changed, the receiver including a first decoder and a second decoder, the first decoder including a plurality of first value of parameters associated with a first set of tones, the second decoder including a plurality of second value of parameters associated with a second set of tones, the first decoder including a first syndrome generator and the second decoder including a second syndrome generator, the syndrome generators being configured to compute a first syndrome associated with the first syndrome generator and a second syndrome associated with the second syndrome generator, the first syndrome being configured to compare a value of parameters of a plurality of received tones with the first value of parameters associated with the first set of tones, the second syndrome being configured to compare a value of parameters of a plurality of received tones with the second value of parameters associated with the second set of tones.

29. A discrete multi-tone modem, the discrete multi-tone modem being in communication with a transmitter, comprising:

a receiver configured for transmitting a change request to the transmitter, the change request being arranged to identify a specific tone to be altered and a desired value for a parameter associated with the identified tone, the receiver configured for receiving a multi-tone signal from the transmitter, the receiver being arranged to determine whether or not the request for change was implemented by the transmitter, wherein the determination of whether the request for change was implemented is based at least in part upon an analysis of a portion of the multi-tone signal that was intended to be changed, the receiver being arranged to monitor one tone of the communication signal, and analyze a first constellation for the tone at a first time with a second constellation for the tone at a second time.

30. A discrete multi-tone modem, the discrete multi-tone modem being in communication with a transmitter, comprising:

a receiver configured for transmitting a change request to the transmitter, the change request being arranged to identify a specific tone to be altered and a desired value for a parameter associated with the identified tone, the receiver configured for receiving a multi-tone signal from the transmitter, the receiver being arranged to determine whether or not the request for change was implemented by the transmitter, wherein the determination of whether the request for change was implemented is based at least in part upon an analysis of a portion of the multi-tone signal that was intended to be changed, the receiver including a monitor for monitoring one tone of the communication signal such that the one tone has been altered to zero based upon the implementation of the change request.

* * * * *